United States Patent [19]
Ochiai et al.

[11] Patent Number: 5,283,489
[45] Date of Patent: Feb. 1, 1994

[54] STRUCTURE FOR TERMINAL SECTION OF MOTOR

[75] Inventors: Takao Ochiai, Ashikaga; Masaki Mita; Eita Kobayashi, both of Kiryu; Takao Umezawa, Gunma, all of Japan

[73] Assignee: Mitsuba Electric Manufacturing Co. Ltd., Gunma, Japan

[21] Appl. No.: 908,168

[22] Filed: Jul. 2, 1992

[30]       Foreign Application Priority Data

| Jul. 4, 1991 | [JP] | Japan | ................ 3-60043[U] |
| Jul. 4, 1991 | [JP] | Japan | ................ 3-60044[U] |
| Jul. 4, 1991 | [JP] | Japan | ................ 3-60045[U] |
| Jul. 4, 1991 | [JP] | Japan | ................ 3-190848 |

[51] Int. Cl.⁵ ............................................ H02K 11/00
[52] U.S. Cl. ................................................. 310/71; 439/11
[58] Field of Search ............ 310/71, 83, 40 MM, 179, 310/187, 210; 174/73.1, 75 R, 84 R; 439/11, 12, 32, 33, 775, 795

[56]           References Cited
           U.S. PATENT DOCUMENTS

| 4,748,355 | 5/1988 | Anderson et al. | ................ 310/71 |
| 5,001,379 | 3/1991 | Katayama | ................ 310/71 |
| 5,025,184 | 6/1991 | Sekine et al. | ................ 310/71 |
| 5,063,317 | 11/1991 | Bruhn | ................ 310/91 |

FOREIGN PATENT DOCUMENTS

| 2-122556 | 10/1990 | Japan | ................ 310/71 |
| 4-19974 | 5/1992 | Japan | ................ 310/71 |

OTHER PUBLICATIONS

Journal of Nippondenso Technical Disclosure, Jan. 1, 1985.

*Primary Examiner*—Steven L. Stephan
*Assistant Examiner*—Matthew Nguyen
*Attorney, Agent, or Firm*—Oliff & Berridge

[57]             ABSTRACT

A structure for a terminal section of a motor having a plurality of terminals juxtaposed with each other and extending in the axial direction of the motor shaft. The plurality of terminals are inserted into an end case covering the yoke opening, and have lead connecting portions at the distal ends thereof, which are exposed to the outside of the end case and to which a plurality of leads are individually connected. The lead connecting portions are exposed in a stepped manner, that is, they are subsequently shifted from each other both in the direction around and in the direction along the motor shaft. The leads are connected to the exposed lead connecting portions from directions substantially perpendicular to the motor shaft. The structure is capable of ensuring a sufficient insulating distance and reducing the motor size without lowering operational efficiency during production and without increasing the number of sealing locations.

9 Claims, 19 Drawing Sheets

STRUCTURE FOR TERMINAL SECTION OF MOTOR

BACKGROUND OF THE INVENTION

1. Field of the Invention

The present invention relates to a structure for a terminal section of a motor. In particular, the invention is a structure for attaching a plurality of leads to a terminal section of a motor.

2. Description of the Related Art

In general, a motor includes a plurality of terminals whose proximal ends are connected to brushes or the like. The distal ends of the terminals need to be exposed to the outside of the motor in order that these ends can be connected to leads. However, there is a risk that, during a soldering operation, conduction may occur between adjacent terminals due to the so-called solder bridge phenomenon. In order to ensure an insulating distance, the terminals must be arranged with sufficient intervals therebetween. As a result, the thus arranged terminals inevitably occupy a great space. When the motor has a large number of terminals, particularly when it is a motor incorporating an additional built-in mechanism such as a rotation detecting mechanism, it is necessary to provide a particularly large space for an arrangement of the terminals, thereby presenting the problem of an increased size of the motor. In view of this problem, it has been proposed to distribute the positions at which the terminals are exposed into two locations so as to reduce the size of the motor. However, with the proposed arrangement, the operation of connecting the leads has to be performed at two locations, thereby lowering the efficiency of the connecting operation during production. In addition, when the portion where the leads are connected is to be resin-sealed, the number of locations at which the sealing operation takes place increases, thereby greatly deteriorating the efficiency of the sealing operation, and hence, increasing the production costs.

In order to prevent the solder bridge phenomenon, an insulating member may be interposed between adjacent lead connecting portions at the distal ends of the terminals. With this arrangement, however, there is a risk that, when sealing the lead connecting portions, the insulating members may hinder the flow of a viscose resin material, thereby deteriorating the sealing ability of the material.

SUMMARY OF THE INVENTION

The present invention has been accomplished in view of the above-described circumstances. An object of the present invention is to provide a structure of a terminal section of a motor which is capable of overcoming the above-described problems. While the invention will be described with reference to the preferred embodiment, connecting a plurality of leads to a terminal section of a motor, those skilled in the art will recognize that the invention could be used on any structure where it is required to connect a plurality of leads to terminals.

According to the present invention, there is provided a structure for a terminal section of a motor, comprising: a plurality of terminals juxtaposed with each other while extending in the axial direction of the motor shaft of the motor, the plurality of terminals being inserted into an end case covering the yoke opening of the motor; lead connecting portions provided at the distal ends of the terminals and exposed to the outside of the end case; and a plurality of leads individually connected to the lead connecting portions of the terminals. The structure is characterized in that the lead connecting portions of the terminals are exposed from the inside of the end case in a stepped manner in which the lead connecting portions are subsequently shifted from each other both in the direction around and in the direction along the motor shaft, and the leads are connected to the exposed lead connecting portions from directions substantially perpendicular to the motor shaft.

The above-specified structure according to the present invention makes it possible to ensure a sufficient insulating distance between the terminals and reduce the size of the motor without involving risks such as reductions in the operational efficiency during production and an increase in the number of sealing locations which causes an increase in the production costs.

DESCRIPTION OF THE PREFERRED EMBODIMENT

An embodiment of the present invention will be described with reference to the accompanying drawings.

Figure 6:
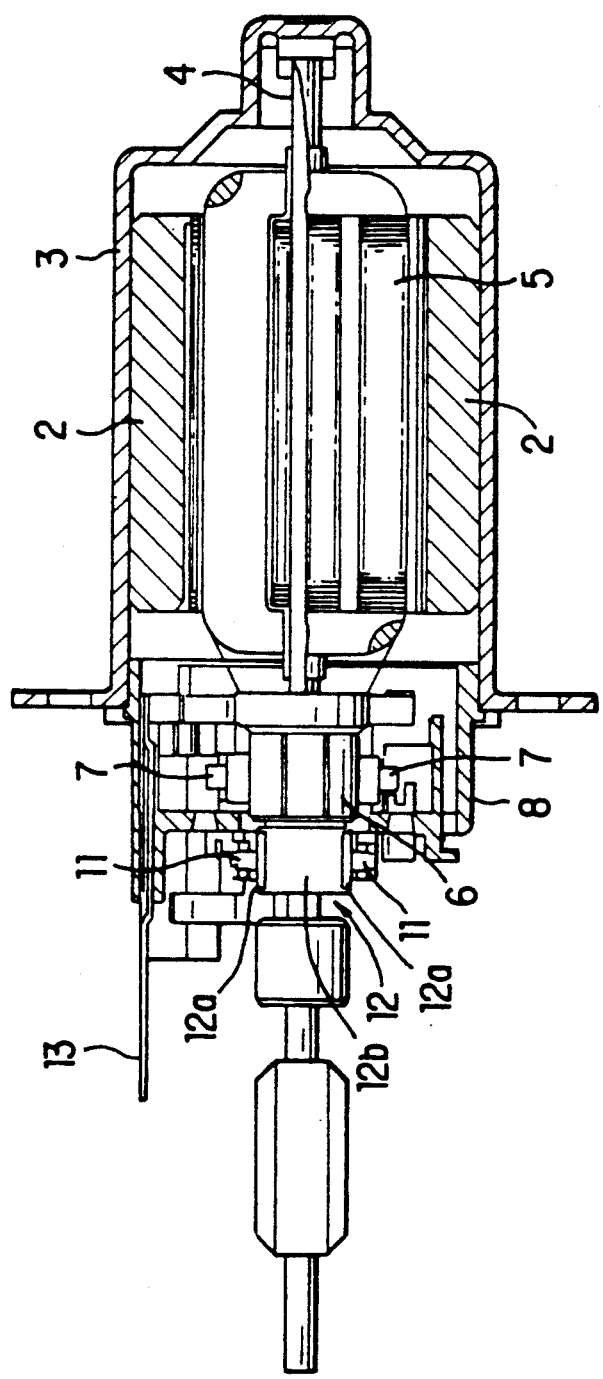
FIG. 6 is a sectional view of a motor assembly of the motor.

Referring to the drawings, reference numeral 1 denotes a a motor 1 equipped with a reduction mechanism. The motor 1 includes, as shown in FIG. 6, a yoke 3, magnets 2 secured to the inner peripheral surface of the yoke 3, a motor shaft 4 mounted in the yoke 3, an armature 5 and a commutator 6, both the armature 5 and the commutator 6 are mounted to the motor shaft 4, a pair of brushes 7 in sliding contact with the commutator 6, a brush holder 8 holding the brush 7, an end case 9 covering the opening of the yoke 3, and a reduction mechanism 10 assembled on the end case 9. These members constitute the basic construction of the motor, which is the same as that in the conventional practice.

Figure 7:
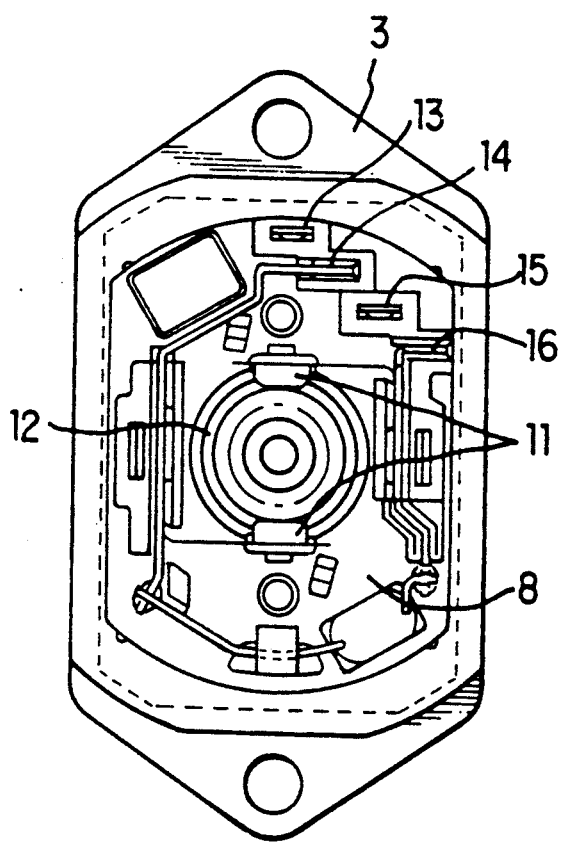
FIG. 7 is a side view of the motor assembly taken from a position on the left side of FIG. 6.

As shown in FIGS. 6 and 7, a pair of rotation detecting brushes 11 are assembled on the brush holder 8, and are constructed to resiliently contact a rotation detecting slip ring 12 disposed beside the commutator 6. The outer peripheral surface of the slip ring 12 has a pair of insulating portions 12b and a pair of conducting portions 12a, which portions are alternately arranged in the circumferential direction of the slip ring 12. The sliding contact of this outer peripheral surface with the rotation detecting brushes 11 makes it possible to detect a conduction signal two times per rotation.

A plurality of terminals 13 to 16 are assembled on the brush holder 8. As shown in FIGS. 14 to 19, the terminals 13 to 16 project from an end face of the brush holder 8 in such a manner that they extend in the axial direction of the motor 4 and that they are arranged along a part of the outer periphery of the brush holder 8. Among the terminals 13 to 16, the terminals 13 and 15 have their proximal ends connected to the brushes 7, while the other terminals 14 and 16 have their proximal ends connected to the rotation detecting brushes 11. Thus, the terminals 13 and 15 connected to the brushes 7 and the terminals 14 and 16 connected to the rotation detecting brushes 11 are alternately arranged, thereby ensuring an insulating distance between adjacent terminals.

Figure 8:
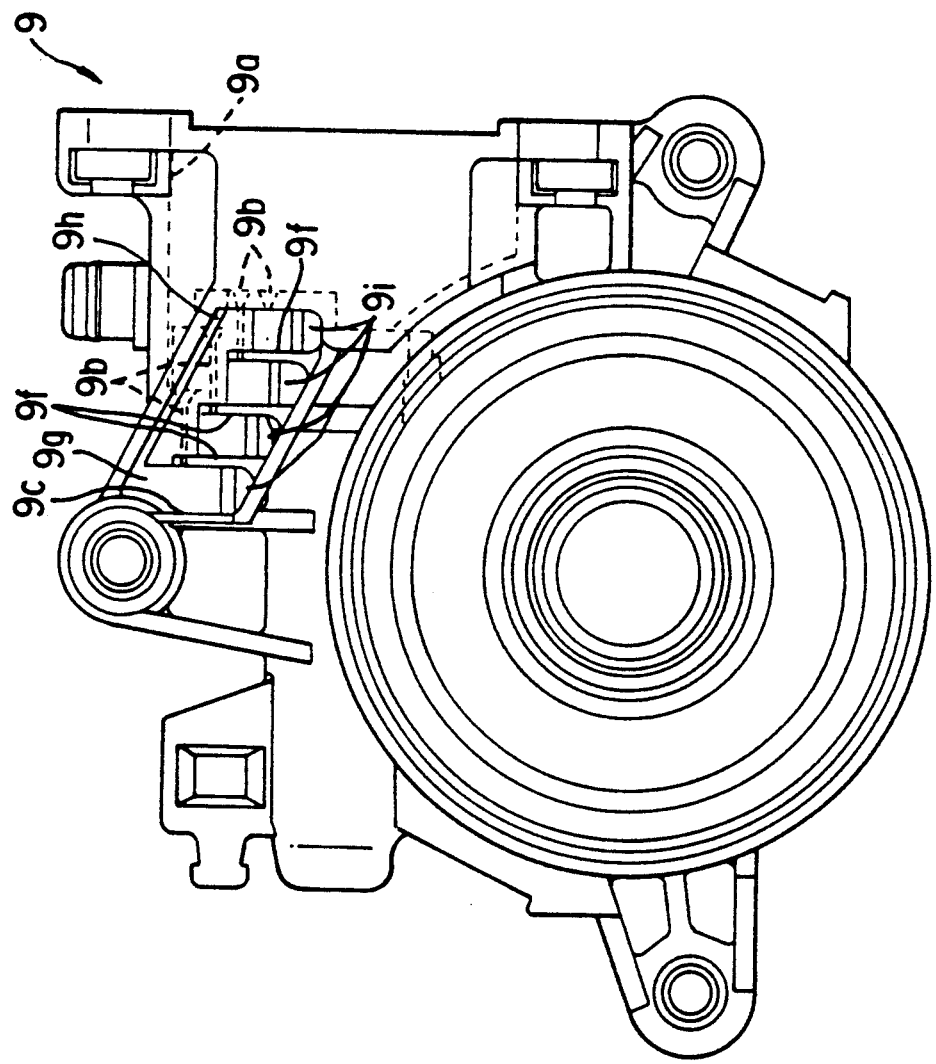
FIG. 8 is a front view of an end case of the motor.
Figure 9:
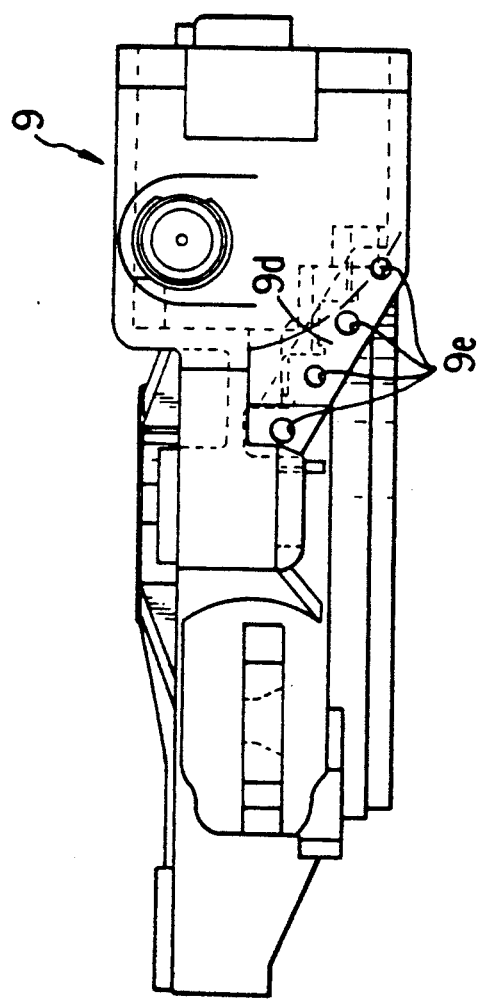
FIG. 9 is a plan view of the end case.
Figure 11:
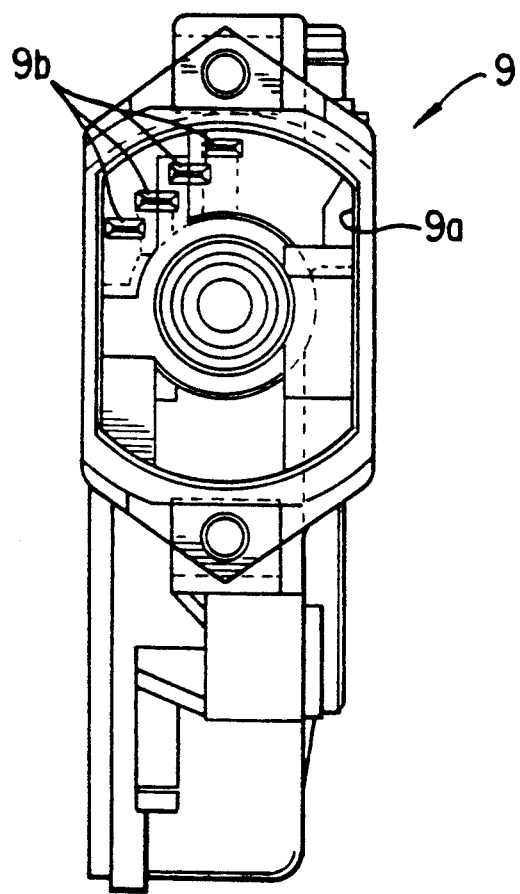
FIG. 11 is a side view taken from a position on the right side of FIG. 8.
Figure 12:
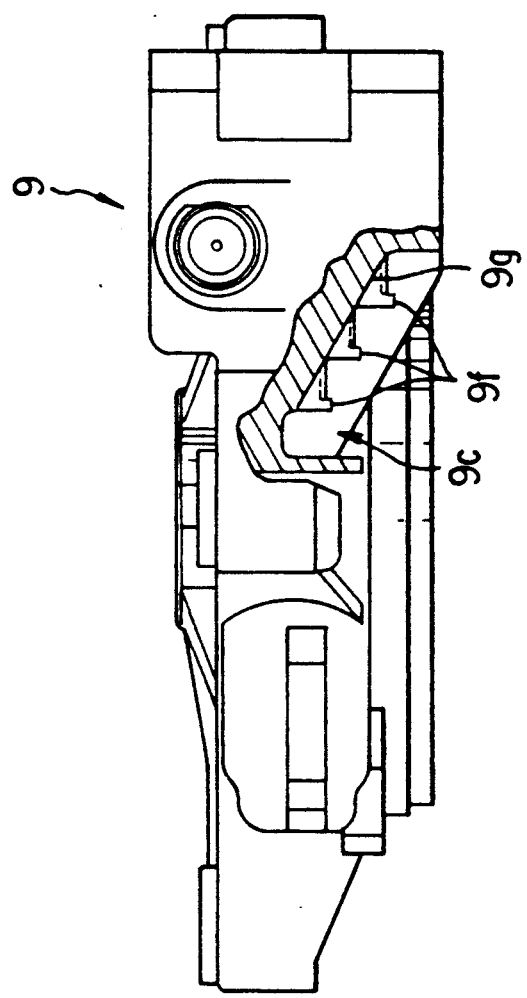
FIG. 12 is a partially-sectioned view of the end case.
Figure 13:
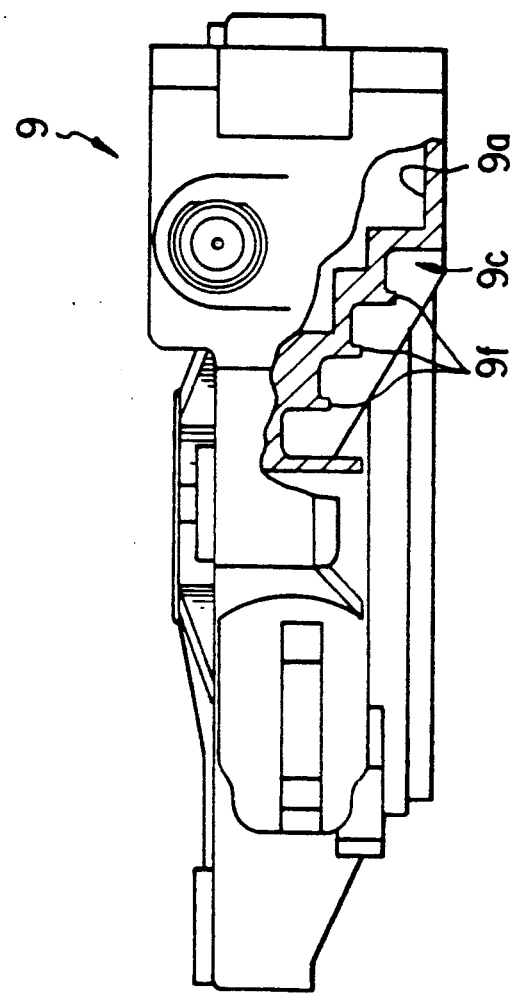
FIG. 13 is another partially-sectioned view of the end case.
Figure 14:
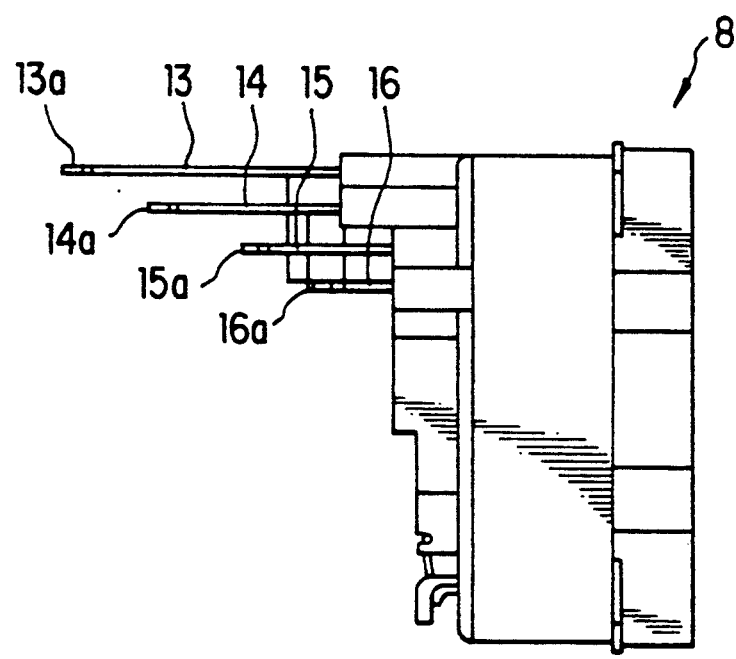
FIG. 14 is a front view of a brush holder assembly of the motor.
Figure 15:
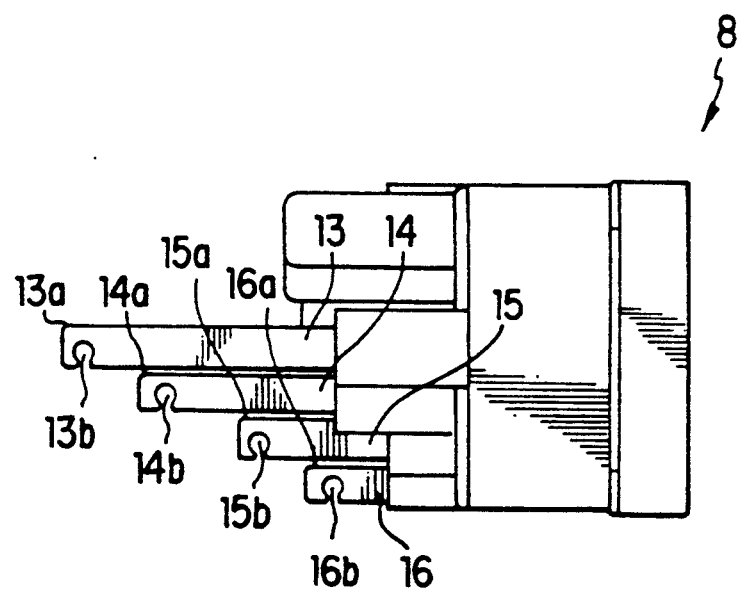
FIG. 15 is a plan view of the brush holder assembly.
Figure 16:
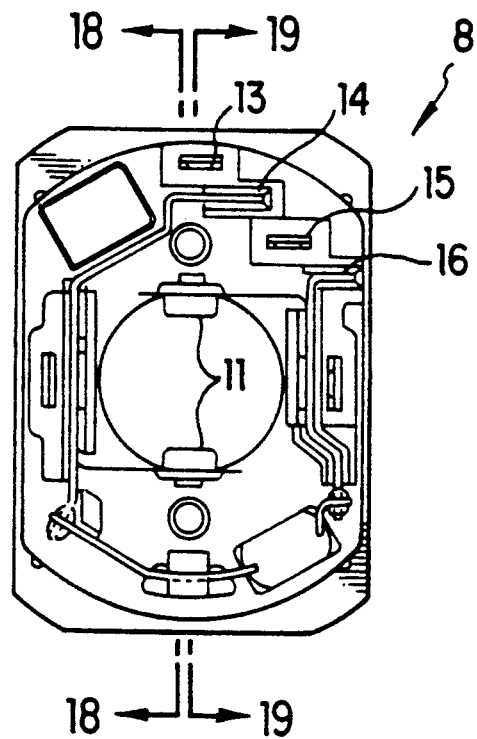
FIG. 16 is a side view taken from a position on the left side of FIG. 14.
Figure 17:
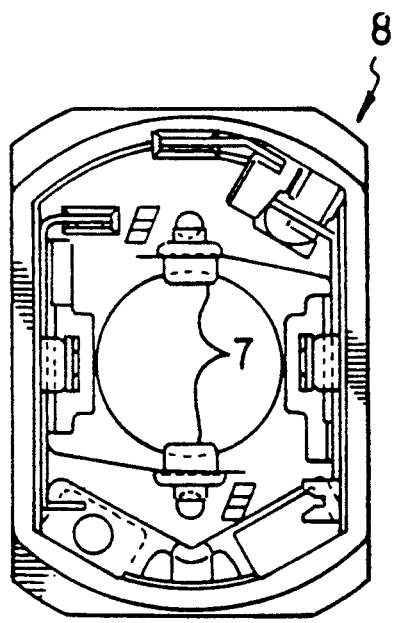
FIG. 17 is a side view taken from a position on the right side of FIG. 14.
Figure 18:
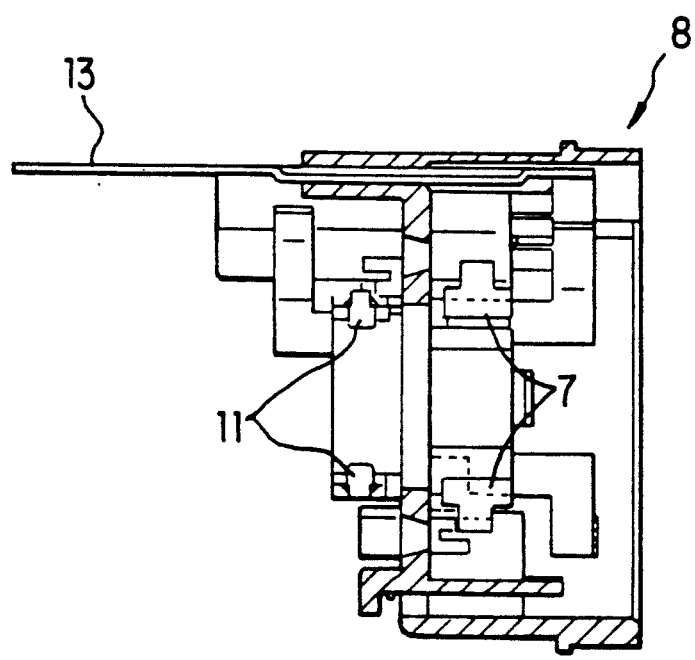
FIG. 18 is a sectional view taken along the line 18—18 shown in FIG. 16.
Figure 19:
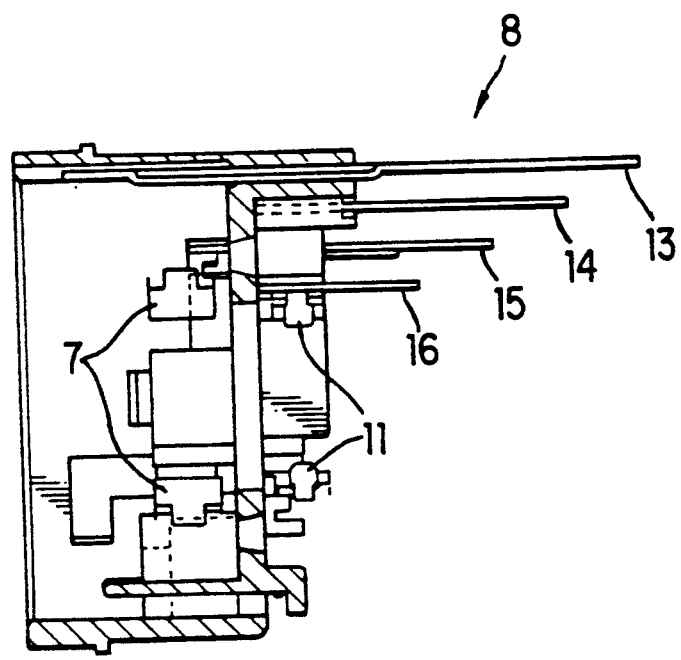
FIG. 19 is a sectional view taken along the line 19—19 shown in FIG. 16.

The brush holder 8 is assembled onto the end case 9 by fitting the brush holder 8 into a holder receptacle 9a (see FIGS. 8, 9 and 11) formed in the end case 9. During this assembly, the terminals 13 and 16 are inserted into terminal insertion holes 9b formed in the end case 9 and extending in the axial direction of the motor shaft 4. The terminals 13 and 16 have lead connecting portions 13a to 16a (shown in FIGS. 14 and 15) at the distal ends thereof, these portions 13a to 16a being exposed to the outside of the end case 9 at positions at which they are subsequently shifted from each other both in the direction around the motor shaft 4 (FIG. 16) and in the direction along the motor shaft 4 (FIGS. 14 and 15). Thus, the lead connecting portions 13a to 16a at the distal ends of the terminals 13 to 16 are exposed from the inside of the end case 9 in a stepped manner, thereby ensuring a sufficient insulating distance between the lead connecting portions 13a to 16a. The lead connecting portions 13a to 16a are formed with lead insertion grooves 13b to 16b through which leads, described later, are inserted.

Figure 1:
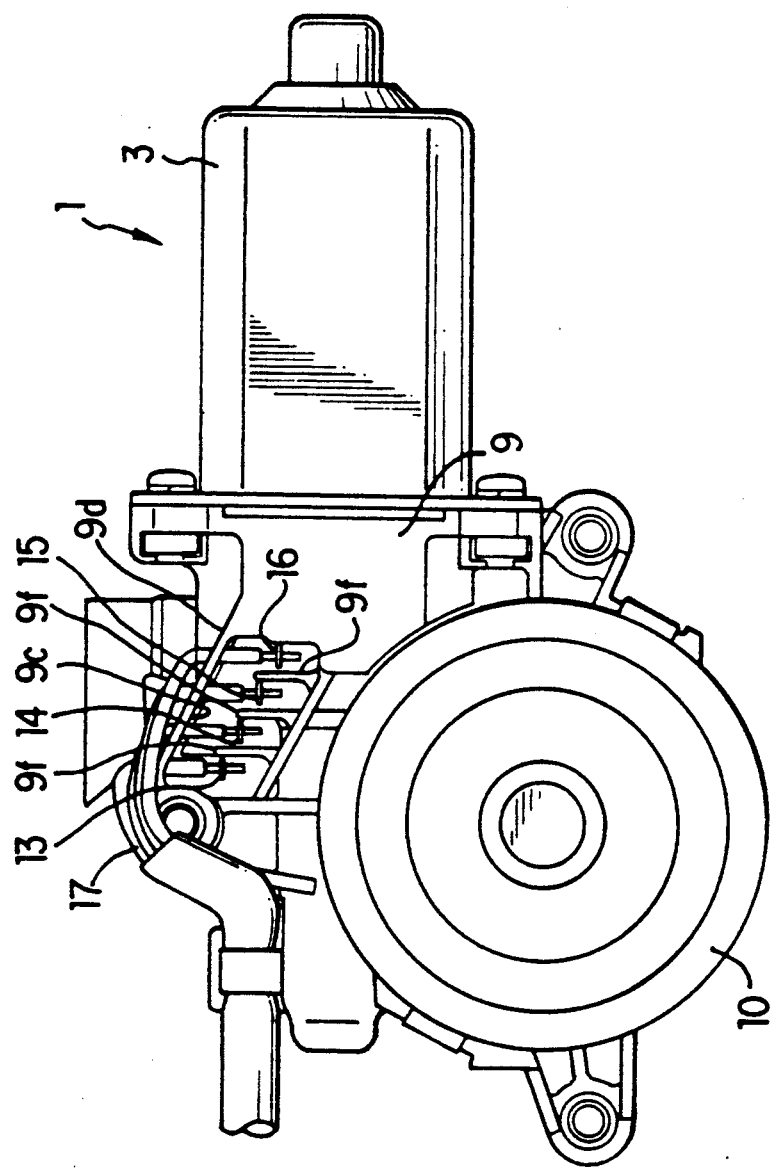
FIG. 1 is a front view of a motor having a terminal-section structure according to the present invention.
Figure 2:
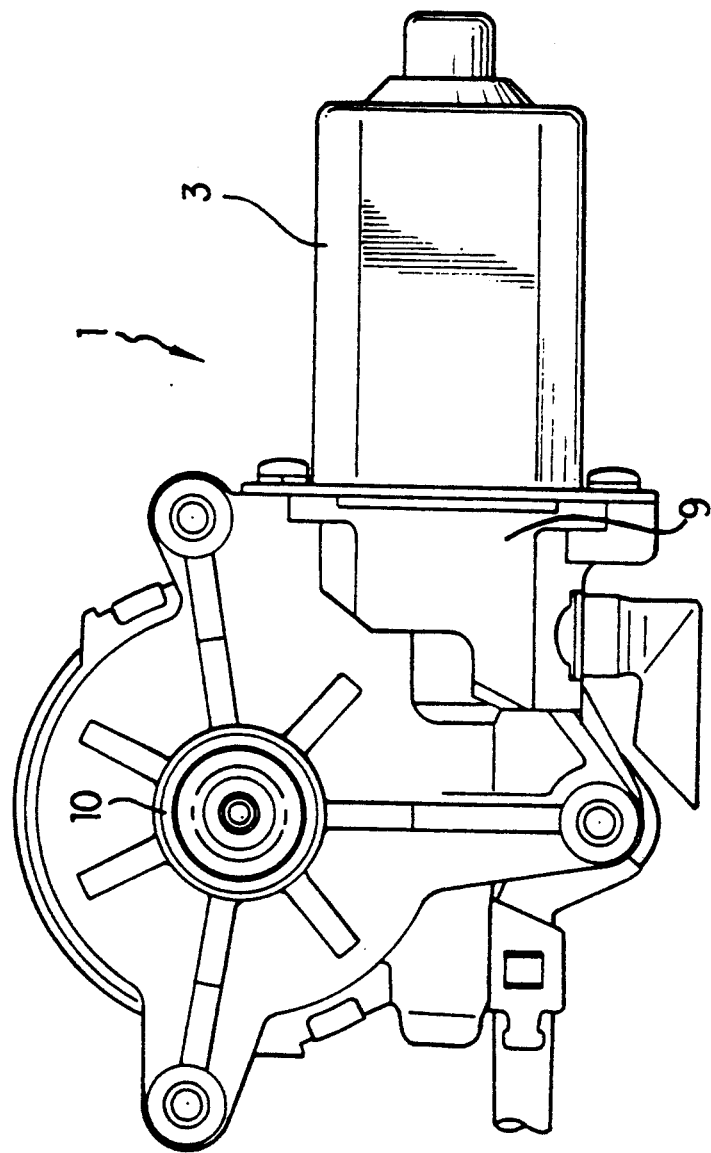
FIG. 2 is a rear view of the motor.
Figure 3:
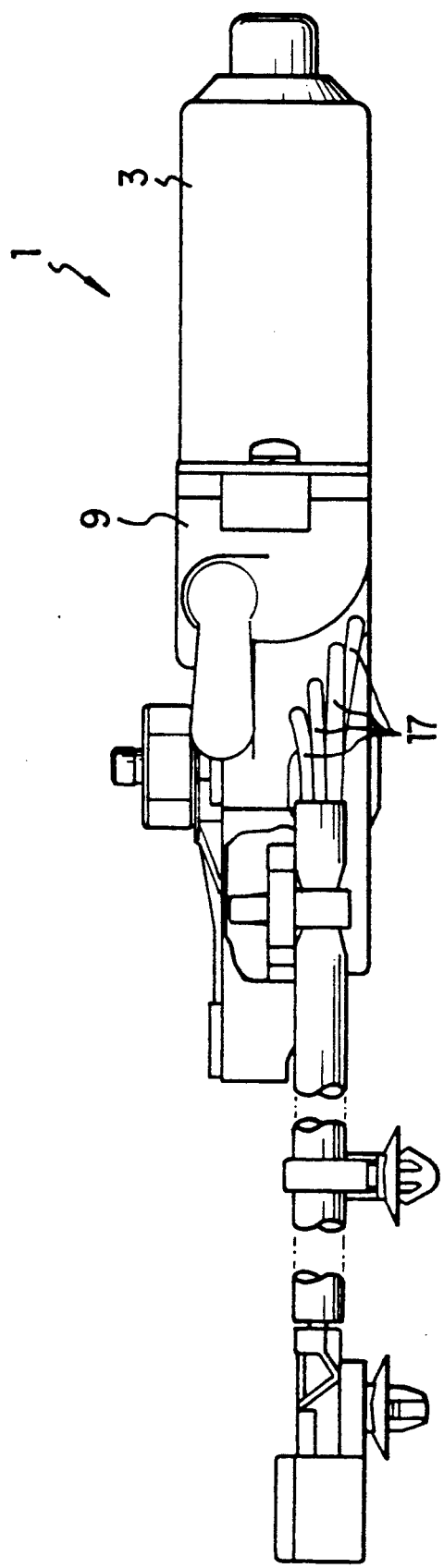
FIG. 3 is a plan view of the motor.
Figure 4:
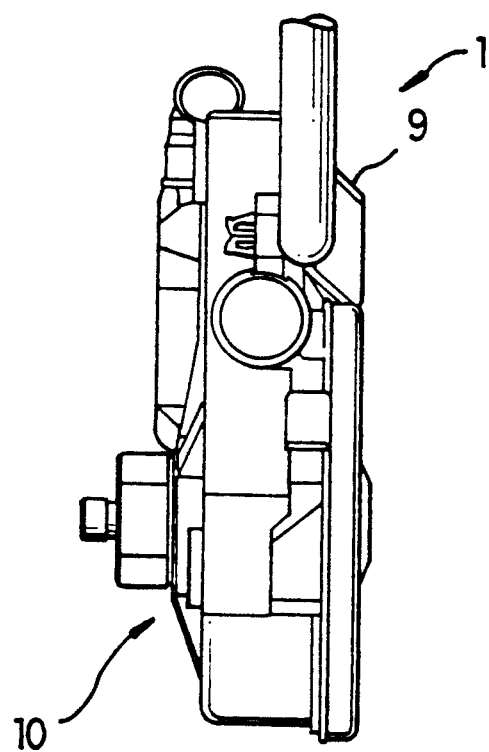
FIG. 4 is a side view taken from a position on the left side of FIG. 1.
Figure 5:
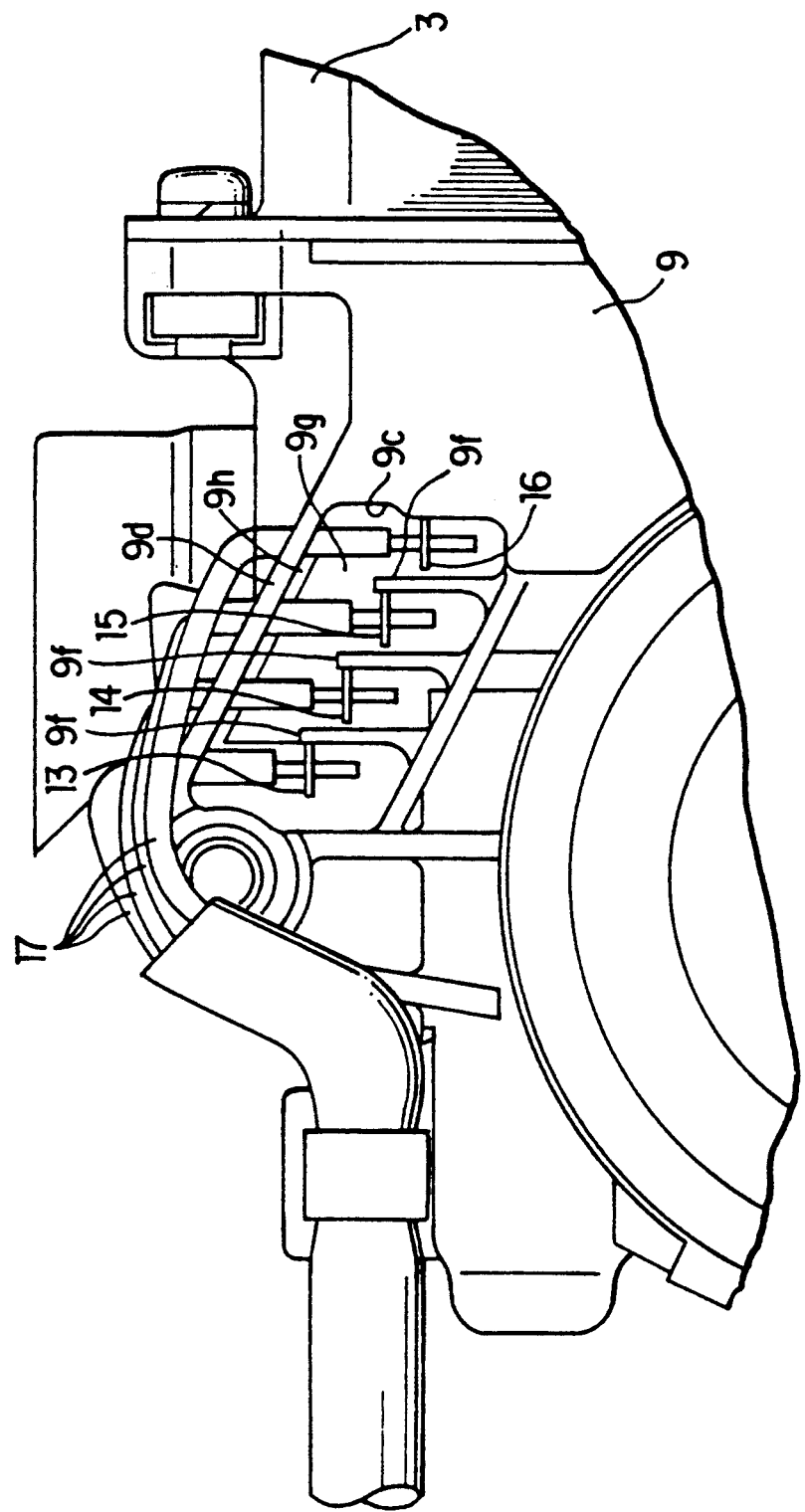
FIG. 5 is an enlarged front view of the essential parts of the motor.

Referring to FIGS. 8 to 13, the end case 9 has a recess 9c formed in an outer surface thereof, the recess 9c having an inclined shape. The recess 9c allows the lead connecting portions 13a to 16a at the distal ends of the terminals 13 to 16 to be exposed to the outside. The recess 9c has a relatively wide opening through which the lead connecting portions 13a to 16a are exposed in a stepped arrangement. The wide opening assures a wide space for the lead connecting operation. Leads 17, extending in directions substantially perpendicular to the motor shaft 4, as best shown in FIG. 5, are solder-connected to the lead connecting portions 13a to 16a. The leads 17 are connected to these portions through a plurality of lead insertion bores 9e (best shown in FIG. 9) formed through a side wall 9d defining a part of the recess 9c. The bores 9c may alternatively have a groove-type cross-section. The insertion of the leads 17 through the lead insertion bores 9e is advantageous in that, during the lead connecting operation, the leads 17 can be temporarily held in place, and that, after the leads have been connected, any tensile load applied to the leads 17 can be absorbed by the side wall 9d, thereby avoiding the risk of the load being directly applied to the soldered portion.

The end case 9 has a plurality of partition walls 9f provided in the recess 9c. The plurality of partition walls 9f extend in the direction in which the leads 17 are inserted into the recess 9c, and are positioned between the lead connecting portions 13a to 16a exposed in a stepped arrangement. Thus, the partition walls 9f serve to prevent the so-called solder bridge phenomenon (unwanted conduction between adjacent terminals) during the soldering operation. After the unoccupied portions of the inside of the recess 9 have been filled with a resin material, the partition walls 9f serve to limit the movement of the terminals 13 to 16 in the thrust direction, thereby restraining the positional deviation of the brushes 7 and the rotation detecting brushes 11 connected to the proximal ends of the terminals 13 to 16.

Figure 10:
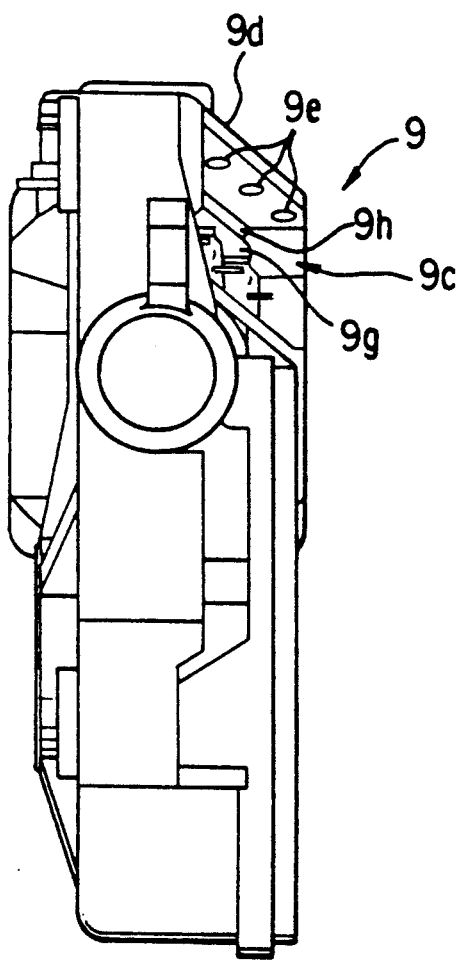
FIG. 10 is a side view taken from a position on the left side of FIG. 8.

A portion of the inside of the recess 9 constitutes a communication groove 9g (shown in FIGS. 5 and 10). The communication groove 9g allows recess spaces containing the exposed portions of the terminals 13 to 16 and partially defined by the partition walls 9f to communicate with each other within a range inside the side wall 9d but beyond the position where the lead connecting portions 13a to 16a are located. Such communication promotes the flow of a resin material charged in the recess 9c, thereby enabling the resin material to positively flow into the recess spaces and into the intervals between the leads 17. A part of the end case 9 which defines the bottom of the communication groove 9g is formed with a thin groove 9h (shown in FIGS. 5 and 10) extending along the side wall 9d. The thin groove 9h allows the flow of the resin material to be further promoted at a location below the lead insertion bores 9e, so that the resin material can flow into the unoccupied portions of the bores 9e.

The recess 9c is also provided with contact pieces 9i (FIG. 8) projecting into the recess spaces containing the exposed portions of the terminals 13 to 16 and partially defined by the partition walls 9f. Each of the contact pieces 9i is formed facing one of the lead connecting portions 13a to 16a with a fixed interval therebetween in the direction of the lead insertion direction, and formed inward of the position of the exposed portion of the terminal. When the leads 17 are to be individually solder-connected to the lead connecting portions 13a to 16a, the contact pieces 9i allow the distal ends of the leads 17 to abut thereon, so that a fixed length of the leads can be inserted into the recess 9c.

With the embodiment of the present invention having the above-described construction, the lead connecting portions 13a to 16a at the distal ends of the terminals 13 to 16 are juxtaposed with each other in a stepped arrangement in which the respective positions of these portions are shifted from each other both in the direction around and in the direction along the axis of the motor shaft 4. Therefore, it is possible to cause the end portions of the terminals 13 to 16 to be exposed through a single recess while making it possible to ensure a sufficient insulating distance without requiring the terminals to be particularly widely separated. Thus, although the motor 1 is of a type having a plurality of terminals, it is possible to eliminate the conventionally entailed drawbacks such as the drawback in which a particularly great space required for the arrangement of the terminals inevitably renders the motor large-sized, and the drawback caused by distributed positions of the exposed end portions of the terminals, namely, a reduction in the efficiency of the lead connecting operation during production caused by distributing the connecting locations, and an increase in the number of resin-material charging locations, which causes an increase in the production cost. Consequently, it is possible to greatly reduce the production costs of the motor 1 having a plurality of terminals.

Since the terminals 13 to 16 are juxtaposed in the direction along a part of the outer periphery of the brush holder 8, there is no need to make the brush holder 8 particularly large-sized.

Since the end case 9 does not require those terminals 13 and 15 connected to the brushes 7 and those terminals 14 and 16 connected to the rotation detecting brushes 11 to be exposed to the outside through different locations but allows them to be exposed from the inside of the single recess 9c, this arrangement of the embodiment can be adopted in the case of a motor which does not have a rotation detecting section, i.e., a motor having a relatively small number of terminals.

Since the recess 9c is configured to be inclined in conformity with the stepped arrangement of the lead connecting portions 13a to 16a, it is possible to render the depth of the recess as small as possible. This makes it possible to facilitate the soldering operation, and hence, to improve the operational efficiency. The above arrangement also makes it possible to reduce the required amount of the resin material to be charged in the recess 9c. Further, the arrangement serves to reduce the size of the motor.

Since partition walls 9f are provided between the lead connecting portions 13a to 16a, it is possible to positively prevent, during the soldering operation, adjacent terminals from conducting with each other through solder bridges. The positive prevention provided by the partition walls 9f permits the terminals 13 to 16 to be arranged close to each other, thereby enabling a further reduction in the size of the motor 1.

Since the partition walls 9f serve to limit the thrust movement of the terminals 13 to 16 after the resin material has been charged, it is possible to positively prevent positional deviation of the brushes 7 and the rotation detecting brushes 11 connected to the proximal ends of the terminals 13 to 16, thereby rendering the motor 1 free from abnormal wear of the brushes 7 or rotation error; in other words, the motor 1 is highly reliable.

The recess 9c includes a communication groove 9g which allows the recess spaces containing the exposed portions of the terminals 13 to 16 and partially defined by the partition walls 9f to communicate with each other within a region inside the side wall 9d but beyond the location where the lead connecting portions 13a to 16a are positioned. Such communication makes it possible to promote the flow of the resin material charged in the recess 9c so that the resin material positively flows into the recess spaces and into the intervals between the leads 17. Thus, it is possible to avoid the risk of bubbles being formed in the resin material in the recess 9c, thereby greatly improving the sealing ability.

Since a portion of the end case 9 defining the bottom of the communication groove 9g is formed with the thin groove 9h extending along the side wall 9d, it is possible to further promote the flow of the resin material at a location below the lead insertion bores 9e. Consequently, the resin material can flow into any unoccupied part of the lead insertion bores 9e, and can have its sealing ability further improved.

Since the leads 17 passed through the lead insertion bores 9e are connected to the lead connecting portions 13a to 16a, the leads 17 can be temporarily held in place during the lead connecting operation. In contrast with the conventional practice where leads are temporarily held in place by caulking, the above arrangement, which does not require caulking, makes it possible to reduce the number of processes, and avoid the risk of great load being applied to the leads by caulking. After the lead connection, the above arrangement allows any tensile load applied to the leads 17 to be absorbed by the side wall 9d without the risk of the load being directly applied to the soldered portion.

The contact pieces 9i are to be utilized when soldering the leads 17 so that, when the distal ends of the leads 17 contact the contact pieces 9i, a fixed length of the leads 17 are inserted. This makes it possible to prevent the risk of the cladding of the leads 17 being fused with the solder.

In brief, the present invention having the above-described construction provides the following advantages:

In a motor having a plurality of terminals juxtaposed with each other and extending in the axial direction of the motor shaft, lead connecting portions of the terminals are exposed from the inside of the end case while arranged in a stepped arrangement in which they are shifted from each other both in the direction around and in the direction along the motor shaft. Therefore, it is possible to ensure a sufficient insulating distance without requiring the terminals to be particularly separated, thereby preventing the motor from being large-sized. Also, it is possible to eliminate the drawbacks entailed by distributing the positions at which the terminals are exposed into a plurality of locations, such as a reduction in the efficiency of the lead connecting operation during production caused by the distribution of the lead connecting locations, and an increase in the number of resin-material charging locations, which causes an increase in the production costs. Consequently, it is possible to greatly reduce the production costs of a motor having a plurality of terminals.

If the lead connecting portions of the terminal are exposed through a single recess formed in the end case, and the recess is simultaneously configured to be inclined in conformity with the stepped arrangement of the lead connecting portions while the inside of the recess is adapted to be filled with a resin material, it is possible to render the depth of the recess as small as possible. This in turn makes it possible to facilitate the connecting operation, and hence, to improve the operational efficiency, and makes it possible to reduce the required amount of the resin material to be charged in the recess. In addition, the above arrangement serves to reduce the size of the motor.

If the recess in the end case is provided with partition walls extending in the direction of the leads and separating the lead connecting portions of the terminal from each other, it is possible to positively prevent, during the soldering operation, adjacent terminals from conducting with each other through solder bridges. The positive prevention permits the terminals to be arranged close to each other, thereby enabling a further reduction in the motor size.

The partition walls serve to limit the movement of the terminals when a resin material is charged in the recess. This makes it possible to positively prevent positional deviation of brushes connected to the proximal ends of the terminals, thereby rendering the motor free from abnormal wear of the brushes or rotation error, in other words, highly reliable.

If the recess includes a communication groove consisting of a recess portion devoid of the partition walls and ranging from the distal ends of the partition walls to a side wall of the recess, the communication groove allows recess spaces partially defined by the partition walls to communicate with each other within a region inside the side wall but beyond the location where the lead connecting portions are positioned. Such communication is advantageous in that, when a resin material is charged into the recess, the flow of the resin material is not hindered by the partition walls but promoted so that the resin material can positively flow into the recess spaces and into the intervals between the leads. Thus, it is possible to avoid the risk of bubble formation in the recess, thereby greatly improving the sealing ability.

If the terminals project from an end face of a brush holder holding brushes in such a manner that they are arranged along a part of the outer periphery of the brush holder, it is possible to juxtapose a large number of terminals without making the brush holder large-sized, and hence, to contribute to the reduction of the motor size.

Leads are connected to the lead connecting portions of the terminal from directions substantially perpendicular to the motor shaft. A side wall of the end case defining a part of the recess is formed with lead insertion portions for inserting leads therethrough. This arrangement makes it possible to temporarily hold the leads in place in contrast with the conventional practice requiring a caulking operation. As a result, it is possible to reduce the number of processes, and avoid the risk of great load being applied to the leads by caulking. After the lead connection, the above arrangement allows any tensile load applied to the leads to be absorbed by the side wall without the risk of the load being directly applied to the connected portion.

If the recess is provided with contact pieces for contacting the distal ends of the leads to limit the length by which the leads are inserted, it is possible to assure that the leads are inserted by a fixed length thereof. This makes it possible to prevent the risk of the cladding of the leads being fused during the connecting operation.

What is claimed is:

1. A structure for a terminal section of a motor including a shaft, an end case and a yoke having an opening, the structure comprising:
   a plurality of terminals juxtaposed with each other and having a shape extending in an axial direction of said shaft of said motor, said plurality of terminals being inserted into said end case covering said opening of said yoke of said motor, each of said plurality of terminals having a distal end;
   lead connecting portions provided at the distal ends of said terminals and exposed outside of said end case; and
   a plurality of leads individually connected to said lead connecting portions of said terminals,
   wherein:
   said lead connecting portions of said terminals are exposed outside of said end case in a stepped manner wherein said lead connecting portions are arranged such that they are shifted from each other both in a direction around and in a direction along said motor shaft, and
   said leads are connected to said exposed lead connecting portions from directions substantially perpendicular to said motor shaft.

2. A structure according to claim 1, wherein said lead connecting portions of said terminals are exposed through a single recess formed in said end case, said recess having an inclined shape in conformity with the stepped arrangement of said lead connecting portions, said recess being filled with a resin material.

3. A structure according to claim 2, wherein said recess is provided with partition walls each extending to an intermediate position within said recess in the direction of said leads so as to separate said lead connection portions of said terminals from each other, said partition walls being absent from a recess portion which is between said intermediate positions and a side wall of said end case, said recess portion constituting a communication groove through which recess spaces partially defined by said partition walls are able to communicate with each other within a region beyond said lead connecting portions but inside said side wall.

4. A structure according to claim wherein said terminals project from an end face of a brush holder holding brushes of said motor in such a manner that said terminals are arranged along a part of the outer periphery of said brush holder, the lead connecting portions of said terminals being exposed from the inside of said end case in accordance with the assembly of said brush holder to said end case.

5. A structure according to claim 1, wherein said lead connecting portions of said terminals are exposed through a single recess formed in said end case, said recess having an inclined shape in conformity with the stepped arrangement of said lead connecting portions, said recess being provided with partition walls each extending in the direction of said leads so as to separate said lead connecting portions of said terminals from each other.

6. A structure according to claim 5, wherein said recess is filled with a resin material, said recess including a portion from which said partition walls are absent, said portion of said recess constituting a communication groove through which recess spaces partially defined by said partition walls are able to communicate with each other within a region beyond said lead connecting portions but inside said side wall.

7. A structure according to claim 1, wherein said lead connecting portions of said terminals are exposed through a single recess formed in said end case, said recess having an inclined shape in conformity with the stepped arrangement of said lead connecting portions, said recess being provided with a side wall formed with lead inserting portions for temporarily holding inserted leads.

8. A structure according to claim 7, wherein said recess is provided with contact pieces for contacting with the distal ends of said leads to limit the length of the inserted parts of said leads.

9. A structure according to claim 1, wherein said lead connecting portions of said terminals are exposed through a single recess formed in said end case, said recess having an inclined shape in conformity with the stepped arrangement of said lead connecting portions, said recess being provided with partition walls each extending to an intermediate position within said recess in the direction of said leads so as to separate said lead connection portions of said terminals from each other, said recess including a portion from which said partition walls are absent, said portion of said recess constituting a communication groove through which recess spaces partially defined by said partition walls are able to communicate with each other within a region beyond said lead connection filled with a resin material.

* * * * *